March 28, 1967 — P. D. BIDDLE — 3,310,997
POWER TRANSMISSION ASSEMBLY
Filed Feb. 17, 1964 — 2 Sheets-Sheet 1

PAUL D. BIDDLE
INVENTOR.
KENDRICK AND STOLZY
BY
ATTORNEYS

March 28, 1967 P. D. BIDDLE 3,310,997
POWER TRANSMISSION ASSEMBLY
Filed Feb. 17, 1964 2 Sheets-Sheet 2

PAUL D. BIDDLE
INVENTOR.
KENDRICK AND STOLZY
BY
ATTORNEYS

United States Patent Office  3,310,997
Patented Mar. 28, 1967

3,310,997
POWER TRANSMISSION ASSEMBLY
Paul D. Biddle, 47th and City Line Ave., Apt. 1306,
Philadelphia, Pa. 19113
Filed Feb. 17, 1964, Ser. No. 345,182
3 Claims. (Cl. 74—650)

This invention relates to devices for transmitting power from one input shaft to two output shafts; and more particularly to a device for transmitting all of the power from the input shaft to the slowest one of the two output shafts.

Although the device of the present invention may have other uses and should therefore not be limited to that specifically disclosed herein, the invention has been found to have special utility when employed in lieu of a differential in land vehicles.

Differentials that are used in automobiles today drive the fastest wheel. This means that when one rear wheel of a car is on a concrete highway and the other rear wheel of the car is on a soft earthen shoulder, the said other wheel will spin and get the full output torque of the motor, whereas it would be most desirable for the slowest wheel to receive all of the torque.

In the past an attempt has been made to overcome the disadvantage of differentials in driving the fastest one of a pair of wheels of a motor vehicle. A device designed to be used in lieu of a differential to drive the slowest one of a pair of wheels is disclosed in U.S. Patent No. 2,481,066. The structure disclosed in this patent includes two cages of metal rollers to be wedged between metal shafts selectively for driving the slowest one of a pair of wheels. A structure similar to an overriding clutch is thus employed.

When the drive is transferred from one set of rollers to another disclosed in the patent, the device is put through a severe mechanical loading. This is due to the fact that the wheel axles are independent and are heavily loaded. These axles therefore actually deflect or bend and such bending initiates binding during changes in driving engagement of the rollers. The cages themselves are weak and the independent axles make matters worse. The device shown in the patent also has a great many moving parts and is slow in changing from a position driving one wheel to a position driving another wheel.

All of the peculiarities of the structure shown in the said patent as pointed out above thus have several serious disadvantages. The independently loaded axles and many moving parts cause the device of the patent to wear out very rapidly. They are also frequently damaged in their own operation. The rollers become flat when one set comes out of a wedged engagement and the other set is rapidly driven into a wedged engagement by a large torque. The rollers also freeze or jam, and the noise and vibration which is attendant upon a change in roller engagement is so great that it is not practical to use the device of the patent. The noise and vibration is, in fact, so great that a motor vehicle operator cannot tell whether or not the device is defective or is operating normally. Further, the noise is so loud that it can be a substantial nuisance.

The above-described and other disadvantages of the prior art are overcome in accordance with the present invention by providing, in a device for driving the slowest one of two separate beam load bearing axles disposed in end-to-end relation and rotatably mounted in a fixed structure, a plate rotatable on said fixed structure. The plate has means on it to engage rotatably the mutually adjacent ends of the axles to hold the axles in alignment with each other. In this case, the axles are supported at their inner ends so that vibration is minimized when a changeover is effected between the drives of the axles. No noise ac companies this changeover in accordance with the present invention. Wear is thereby minimized. Damage is completely avoided. Further, the support of the mutually adjacent ends of the axles improves the strength of each. The axles are more securely mounted and jamming is thereby avoided. Further, the prior art disadvantage of flattened sides of the prior art metal rollers is also avoided.

In accordance with another outstanding feature of the present invention, projections are employed on two different cages of metal rollers to limit cage movement of one and roller contact of the said one with the driving housing when the rollers of the other cage are engaged with the driving housing. This construction of the present invention likewise prevents differential jamming.

The cages constructed in accordance with the present invention also positively hold rollers and provide a larger area and therefore a stronger bearing surface.

Spring-biased pins are provided in accordance with the present invention, between the metal roller cages and cylindrical friction type clutch faces. This construction makes the device of the present invention actuable immediately upon change in relative axle speeds.

The above described and other advantages of the present invention will be better understood from the following description when considered in connection with the accompanying drawings which are to be regarded as merely illustrative:

Figure 1:
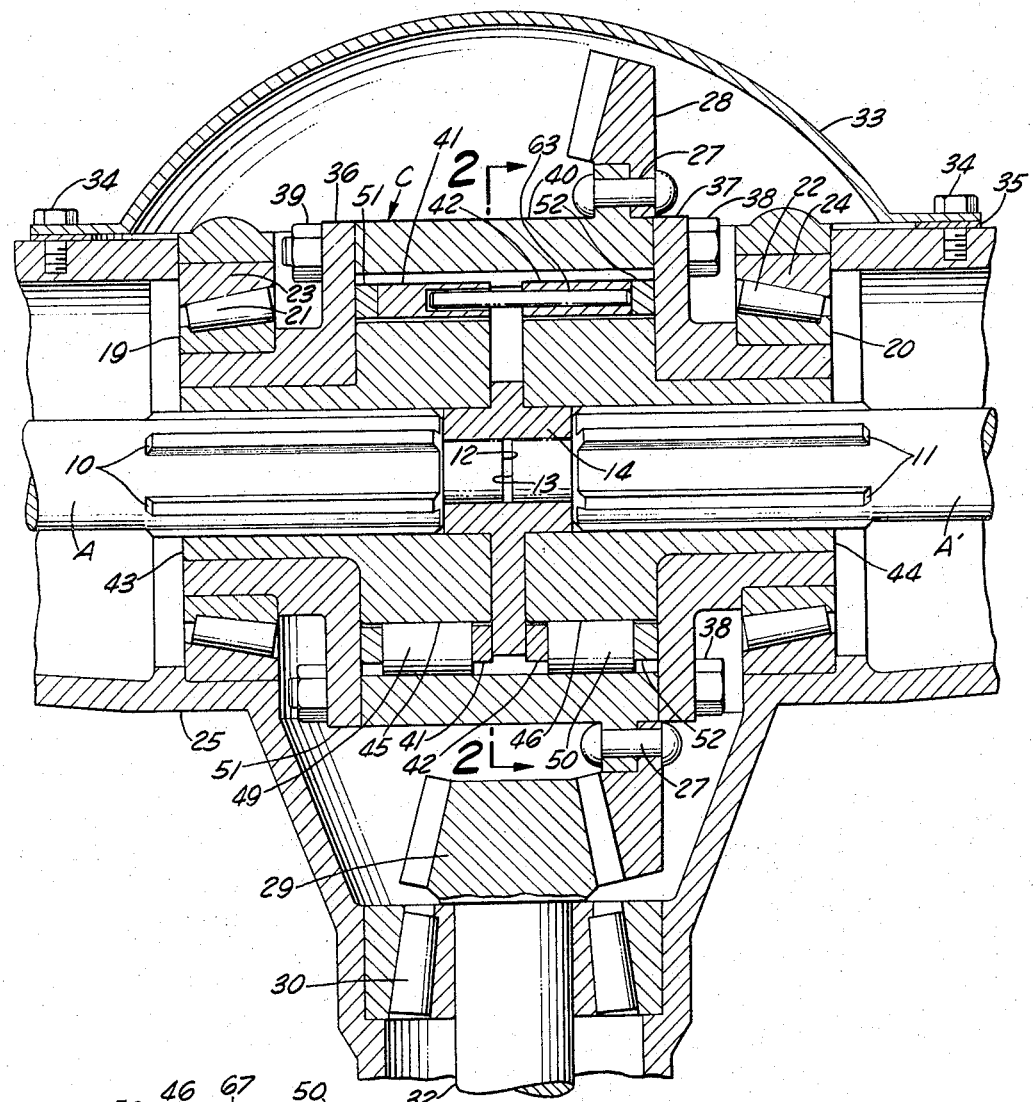
FIG. 1 is a longitudinal sectional view through a device to take the place of 1 conventional differential in, for example, an automobile.

In the drawing in FIG. 1, axles A and A' are shown which are splined at 10 and 11, respectively. Axles A and A' terminate at ends 12 and 13, respectively, adjacent a hub 14 of a spider 15. Other than the fact that ends 12 and 13 of axles A and A' are spaced apart at hub 14, axles A and A' may be identical to the self-same axles so labeled in the said patent.

The device of the present invention is provided with a fixed housing 25 which likewise may be identical to housing 25 shown in the said patent. The same is true of a propellor shaft 32, an anti-friction bearing 30 therearound, a driving pinion gear 29, rivets 27, and a ring gear 28, which is fixed to a cylindrical case C by the rivets 27.

A cover for housing 25 is provided at 33 which is fixed thereto by bolts 34. A gasket is provided at 35 between cover 33 and housing 25.

Also shown in FIG. 1 are inner bearing races 19 and 20, bearings 21 and 22, outer bearing races 23 and 24, all of which are identical to parts identical and of identical movements shown in the drawing of said patent.

Thus far, it will be apparent that, except for axles A and A', and case C, the structures described in FIG. 1 are identical to those shown in the said patent. This is not true of the remainder of the structures to be described.

A pair of annular bodies 36 and 37 are bolted together at 38 and 39 through a cylinder 40. Roller bearing cages 41 and 42 are rotatable to a small degree in side cylinder 40 between it and corresponding axially slotted members 43 and 44, respectively. Members 43 and 44 are slotted internally to drive axles A and A', respectively, by the splined connection. Members 43 and 44 have smooth cylindrical clutch faces 45 and 46, respectively, which are engaged by rollers, for example, at points 47 and 48 shown in FIG. 5.

Note will be taken that cage 41 is provided with 8 rollers 49 and cage 42 is provided with 8 rollers 50. End plates 51 and 52 are provided for cages 41 and 42. Cages 41 and 42 are perfect rings of rectangular cross section except for portions cut out of the same as indicated at 53 in FIG. 5. End plates 51 and 52 are rings of a uniform rectangular cross section throughout their circumferences and are welded to cages 41 and 42 to maintain metal rollers 49 and 50 therein, respectively.

Figure 2:
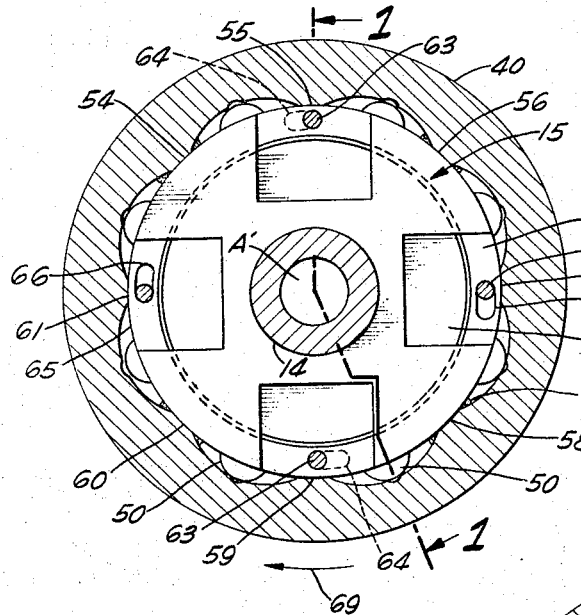
FIG. 2 is a transverse sectional view through the device taken on the line 2—2 shown in FIG. 1, the section of FIG. 1 being indicated at 1—1 in FIG. 2.
Figure 2A:
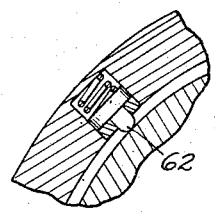

Spider 15 is fixed in cylinder 40 at points 54, 55, 56, 57, 58, 59, 60 and 61 as shown in FIG. 2 by weld fillets W.

Initial engagement of cages 41 and 42 with clutch faces 45 and 46 of members 43 and 44 is effected through conventional spring-biased pins having rounded ends in cages 41 and 42 as indicated at 62 in FIG. 2. That is, pin 62 and their location in the apparatus of the invention is not conventional although the pins and the bias therefor, by themselves are conventional.

As indicated in FIG. 1, cage 42 has a pair of pins 63 fixed thereto which extend into corresponding slots 64 in cage 41.

Similarly, cage 41 is provided with pins 65 which project into slots 66 in cage 42 as shown in FIG. 2. Pins 63 and slots 66 are symmetrical with rollers 50. Pins 65 and slots 64 are symmetrical with rollers 49.

Figure 5:
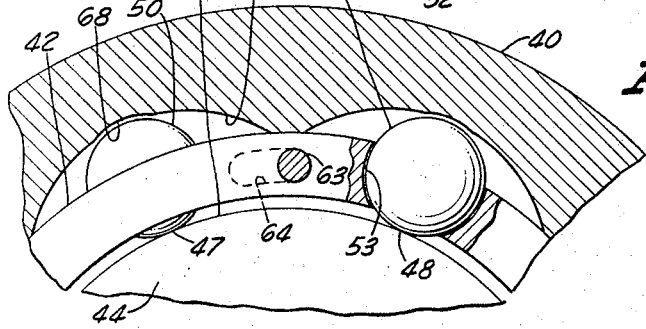
FIG. 5 is an enlarged view of a top portion of FIG. 2.

Cylinder 40 has a concave surface cylindrical in shape which surrounds each of rollers 50 as indicated at 67 in FIG. 5. A second concave surface of smaller radius is also provided at 68 at the top of surface 67. Surface 68 is spaced a substantial distance from rollers 50 to prevent engagement of rollers 50 with cylinder 40 when they are symmetrically positioned within the surface 67 as shown in FIGS. 2 and 5. When separated at the very center, the structure inside case C in the lefthand half of FIG. 1 is identical to that in the righthand half. For this reason, only the cage 42 and the structure on the right side in FIG. 1 is described in detail. By identical, what is meant is that although, for example, pins 65 on cage 41 are not at the same angular position as pins 63, each race does have a pair of pins which are symmetrically disposed with each corresponding sets of rollers 49 and 50. The same is true of slots 64 and 66, pins 62, etc.

Figure 3:
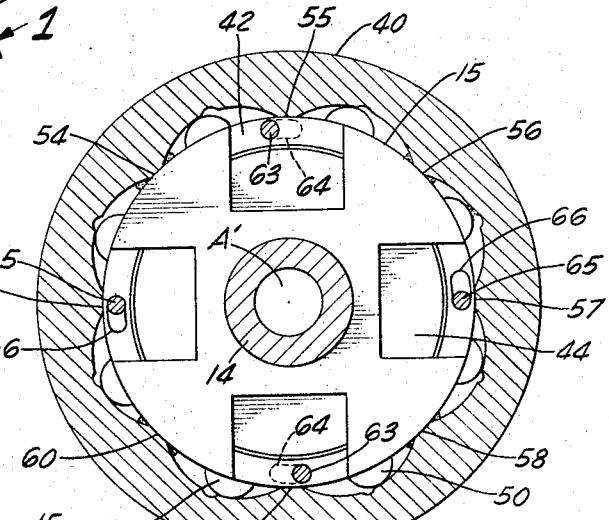
FIG. 3 and FIG. 4 are operational views similar to FIG. 2.
Figure 4:
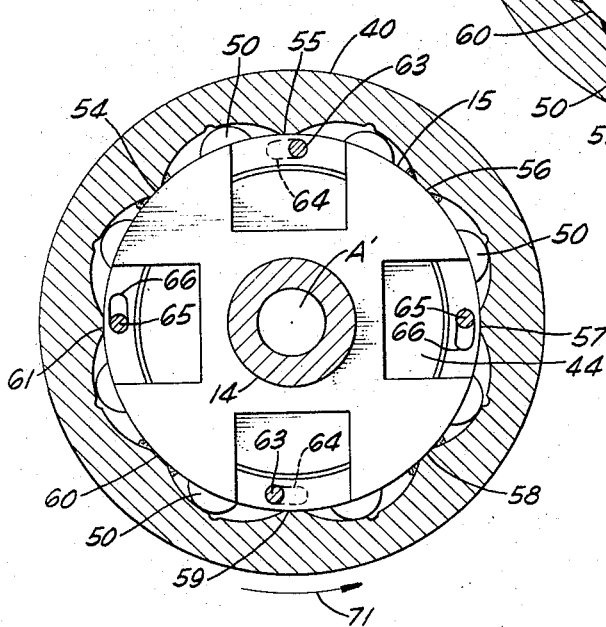

The views of FIGS. 2, 3 and 4 are operational. One operational view has been omitted. This is the view in which both axles A and A' are driven. This view would be identical to that of FIG. 2 with the exception that pins 63 would be moved to the left side shown in FIG. 3.

The view of FIG. 2 is an operational view showing only axle A being driven. In this case, rollers 49, not shown, engage surfaces 67 of cylinder 40 and slots 64 prevent the slower speed axle A' from driving cage 42 and rollers 50 backwards or to the position shown in FIG. 4. This function is achieved not only by the location of pins 63 in slots 64, but also slots 66 surrounding pins 65. The direction of driving motion of cylinder 40 assumed in FIG. 2 is indicated by arrow 69.

The motion of cylinder 40 in FIG. 3 is assumed in the same direction as indicated at 70. However, in FIG. 3, cylinder 40 drives cage 42, and rollers 49 in cage 41 remain in the centrally located position similar to rollers 50 shown in FIG. 2.

The apparatus of the present invention will work in reverse as well as it will work when being driven forward. The assumed direction of driven rotation of cylinder 40 is indicated for this purpose at 71 in FIG. 4.

In the operation of the device of the present invention, if cylinder 40 is driven in the direction of arrow 70 shown in FIG. 3 and axle A is the slowest to rotate in that direction, rollers 50 will become wedged in between cylinder 40 and clutch face 46. Axle A' is then driven through its splined connection with member 44. In this case axle A and member 43 rotate free of case C because rollers 49 are held away from cylinder 40 symmetrically spaced from surfaces 68 therein. Rollers 49 are so held by cage 41. Cage 41, in turn, is held in an appropriate position to do this by pins 63 and 65, and slots 64 and 66. In this case, the relative positions of pins 63 and 65 in slots 64 and 66 are shown in FIG. 3. When axle A is driven or the direction of motion changes, everything is reversed.

From the foregoing it will be appreciated that spider 15 gives substantial support to axles A and A' by bracing the same relative to cylinder 40. This construction minimizes vibration when the drive is changed from one axle to the other by effecting a shift of roller position from that indicated in FIG. 2 to that indicated in FIG. 3, or vice versa. Such a changeover, in accordance with the present invention, is not accompanied by any disagreeable noise or violent impact. Flattening of the sides of rollers 49 and 50 is also thereby prevented. The device of the present invention further does not become jammed in either driving position.

In accordance with another outstanding feature of the present invention, jamming is further prevented by the use of pins 63 and 65, and slots 64 and 66.

In accordance with another feature of the present invention rollers 49 and 50 are retained securely in cages 41 and 42 as indicated in FIG. 5 in that cages 41 and 42 completely surround those portions of rollers 49 and 50 indicated in FIG. 5. The ends of rollers 49 and 50 are also secured in cages 41 and 42 thereby, and by race end plates 51 and 52. A better bearing surface is also provided at 53 in both cages 41 and 42.

Still another feature of the present invention resides in the use of spring-biased pins 62 to cause rollers 49 and 50 to begin initial wedging engagement between surfaces 67 in cylinder 40 and the external clutch surfaces 45 and 46 of members 43 and 44, respectively. This construction effects prompt engagement or wedging action of rollers 49 and 50 between cylinder 40 and members 43 and 44.

Although only one specific embodiment of the present invention has been shown and described, many changes and modifications thereof will, of course, suggest themselves to those skilled in the art. The invention is, therefore, not to be limited to this single specific embodiment selected for this disclosure, the true scope of the invention being defined only in the appended claims.

What is claimed is:

1. In a power transmission, the combination comprising: two separate beam load bearing axles disposed in end-to-end relation; a fixed structure; a housing rotatable on said fixed structure, said housing surrounding the mutually adjacent ends of said axles; a plate braced in said housing; alignment means on said plate extending around each of said mutually adjacent axle ends to hold said ends thereof in a position such that the axis of one of said axles lies in alignment with the axis of the other one thereof, the clearance between said means and an axle being sufficiently large to permit said axle to rotate about its axis relative to said means; and clutch means between said housing and both of said axles holding the slowest one of said axles stationary relative to said housing, said clutch means including a hollow, splined clutch cylinder on the said splined end on each of said axles, a cage around each cylinder, and a set of rollers in each cage to become wedged between the slowest cylinder and said housing.

2. In a power transmission, the combination comprising: two separate beam load bearing axles disposed in end-to-end relation; a fixed structure; a housing rotatable on said fixed structure, said housing surrounding the mutually adjacent ends of said axles, said axle ends being splined; hollow splined circumferential clutch cylinders on said axle ends; a spider braced in said housing; a cylindrical appendage on each side of said spider to fit inside said hollow cylinders; and clutch means between said housing and both of said axles holding the slowest one of said axles stationary relative to said housing, said clutch means including a hollow, splined, clutch cylinder on the said splined end on each of said axles, a cage around each cylinder, and a set of rollers in each cage to becomes wedged between the slowest cylinder and said housing.

3. In a power transmission, the combination comprising: a fixed structure; two separate beam load bearing axles disposed in end-to-end relation and rotatably mounted in said fixed structure; a plate rotatable on said fixed structure, said plate having alignment means thereon to engage rotatably the mutually adjacent ends of said axles to hold said axles in alignment with each other; and clutch means between said housing and both of said axles holding the slowest one of said axles stationary relative to said housing, said clutch means including a hollow, splined clutch cylinder on the said splined end on each of said axles, a cage around each cylinder, and a set of rollers in each cage to become wedged between the slowest cylinder and said housing.

References Cited by the Examiner

UNITED STATES PATENTS

| | | | |
|---|---|---|---|
| 943,746 | 12/1909 | Hatfield | 74—650 |
| 997,617 | 7/1911 | Gilpin | 74—650 |
| 1,002,870 | 9/1911 | Rogers | 74—650 |
| 1,067,078 | 7/1913 | Taylor | 74—650 |
| 1,104,160 | 7/1914 | Annable | 74—650 |
| 1,202,500 | 10/1916 | Fleenor | 74—650 |
| 1,270,897 | 7/1918 | Taylor | 74—650 |
| 1,437,453 | 12/1922 | Sheckler | 74—650 |
| 1,560,672 | 11/1925 | Doak | 74—650 |
| 1,677,682 | 7/1928 | Ortt et al. | 74—650 |
| 1,899,834 | 2/1933 | Thomas et al. | 192—44 |
| 3,124,972 | 3/1964 | Seliger et al. | 74—650 |
| 3,173,309 | 3/1965 | Seliger | 74—650 |

FOREIGN PATENTS 536,461   12/1955   Italy.

DAVID WILLIAMOWSKY, *Primary Examiner.*

J. R. BENEFIEL, *Assistant Examiner.*